July 18, 1967            A. E. LAWS            3,331,395

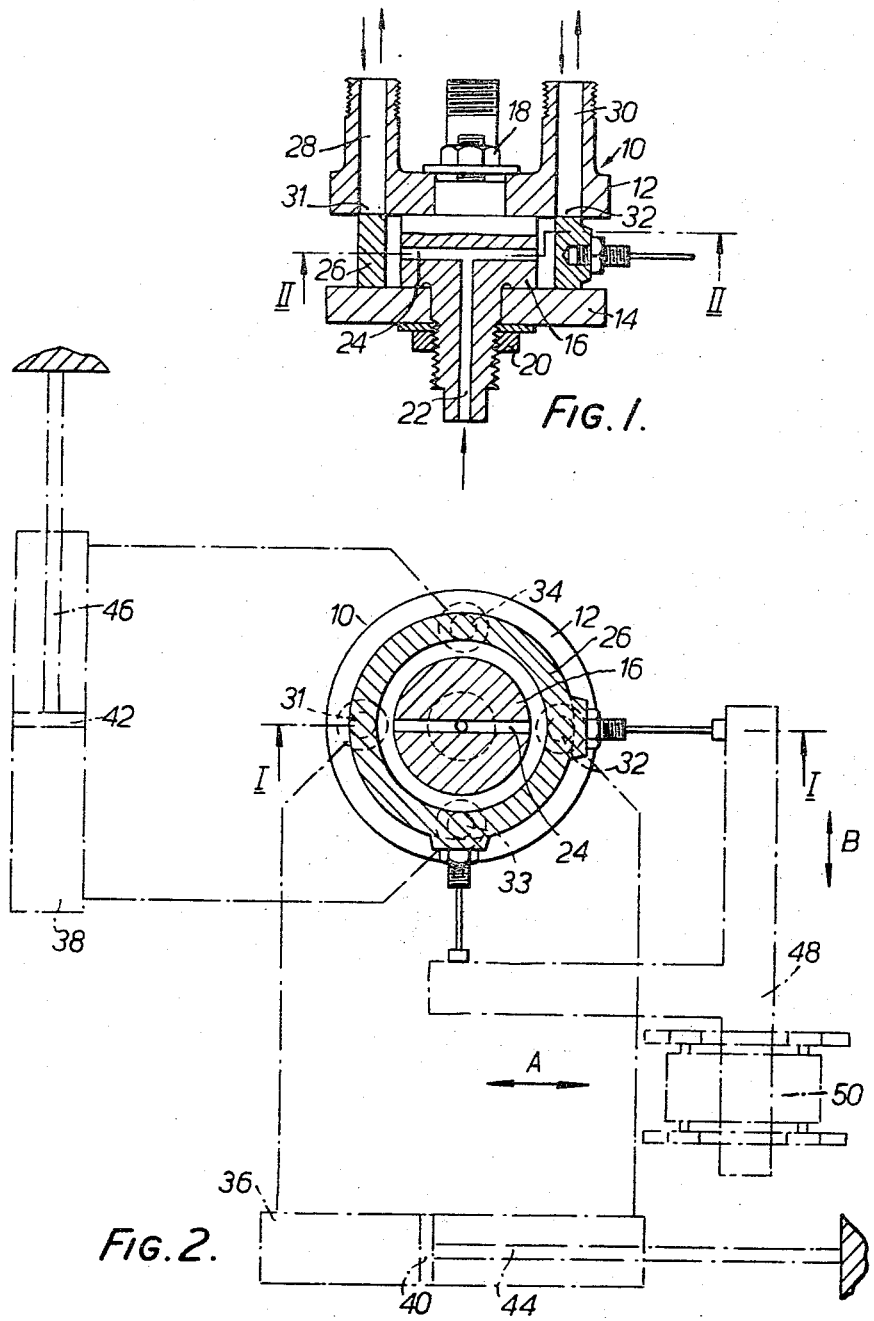

FLUID PRESSURE SERVO CONTROL VALVE

Filed Oct. 1, 1964            2 Sheets-Sheet 2

INVENTOR
ARTHUR ERNEST LAWS
BY
ATTORNEYS

United States Patent Office 3,331,395
Patented July 18, 1967

3,331,395
FLUID PRESSURE SERVO CONTROL VALVE
Arthur E. Laws, St. Albans, England, assignor to
Trubenised Company (registered trust)
Filed Oct. 1, 1964, Ser. No. 400,812
8 Claims. (Cl. 137—625.2)

This invention relates to fluid-pressure servo control valves which include a pair of spaced parallel guide faces, working valve ports opening each through one or other of the said faces, a ring member loacted between said faces and forming a boundary between an inner space within the ring member and an outer space surrounding the ring member, the ring member being slidably movable relative and only parallel to the said guide faces and having a relative datum position whereat there is a predetermined degree of communication of each of the ports with the inner and outer spaces, and wherein a relative translational movement of the ring member from the datum position varies the degree of communication between at least one of the said ports and the said spaces, According to the invention the ring member is movable in any direction (parallel with the guide faces) away from the datum position and that at least two of the working ports are so positioned that movement of the ring member is able to alter differentially or in equal measure (according to the direction of movement) the degree of communication between those respective ports and the said spaces.

The term "ring member" is used herein to denote an endless limb.

With such an arrangement, the relative translational movement of the ring member is effectively resolved in two mutually inclined directions: the change of communicataion at one of the ports indicates the presence of a component of the relative translational movement in one of the two directions, while the change of communication at the other port indicates the presence of a similar component in the other of the two directions.

Preferably, the permitted relative translational movement of the ring member from the datum position is not greater than the diameter of the ports, whereby upon a relative translational movement of the ring member from the datum position in any given direction the communication of a first one of the valve ports with one of the inner and outer spaces increases by a first amount, and the communication of a second one of the valve ports with one of the inner and outer spaces increases by a second amount, the first and second amounts being functions respectively of the resolved components of the displacement in two different directions. With this arrangement, the magnitude of the change of communication at one of the ports is a function of the resolved component of the displacement in one of the two directions, while the magnitude of the change of communication at the other of the ports is a function of the resolved component of the displacement in the other of the two directions.

According to a second aspect of the invention, there is provided a fluid pressure servo system which includes a servo control valve according to the invention.

The scope of the invention is defined by the appended claims; and how it can be carried into effect is hereinafter particularly described with reference to the accompanying drawings, in which:

FIGURE 1 is a section of a servo control valve according to the invention on the line I—I of FIGURE 2;

FIGURE 2 is a diagram of a servo system according to the invention with a section of the valve on the lines II—II of FIGURE 1;

Figure 3:
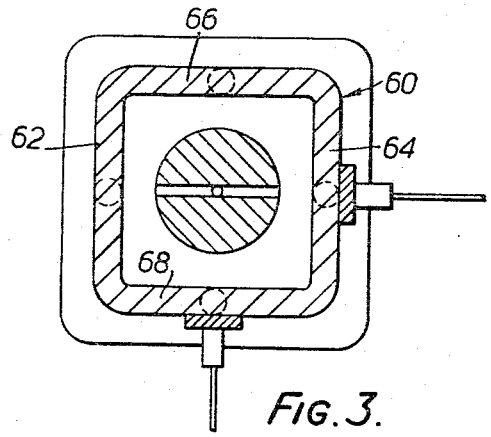
FIGURE 3 is a section, similar to that of FIGURE 2, of another form of valve according to the invention.

A valve casing 10 (FIGURE 1) comprises upper and lower flat plates 12 and 14 between opposed parallel faces of which is disposed a central spacer 16. The spacer 16 is spigoted in both the plates 12 and 14 and is secured thereto by nuts 18 and 20 respectively. There is a central axial bore 22 in the spacer, this bore leading from outside the valve casing and communicating with a diametral bore 24 leading to the space between the plates 12 and 14. Surrounding the spacer 16 is an annular valve member 26 of rectangular shape in cross section (FIGURE 1). The inner and outer curved surfaces of the valve member 26 are accurately and concentrically ground. The valve member 26 is slidably mounted between the plates 12 and 14, which act as seals.

The upper plate 12 is apertured to form four passages, of which two are indicated at 28 and 30, these passages terminating in valve ports 31–34 (FIGURE 2). The axes of the ports 31 and 32 and the axes of the ports 33 and 34 lie in planes through the axis of symmetry of the valve casing and the axes are equidistant from that centre, so that the valve ports are arranged at the corners of a square. The ports are of such size and spacing that, in a central or datum position, the valve member 26 covers them. The radial thickness of wall of the ring member 26 is substantially equal to the diameter of the ports, but there may be slight overlap or underlap as is usual in such valves. In the datum position, the tangents to the ring member at the respective ports are mutually perpendicular.

The bore 22 is connected to a source of air under pressure and the ports 31–34 constitute working ports and are connected, the ports 31 and 32 to opposite ends of a first double-acting servomotor 36 and the ports 33 and 34 to opposite ends of a second double-acting servomotor 38. The servomotors 36 and 38 have pistons 40 and 42 and piston rods 44 and 46 which are movable in directions which are normal to each other. The piston rods 44 and 46 are connected to a member (not shown), for example a compound slide, whose movement is to be effected; the valve casing 10, that is to say the upper and lower flat plates 12 and 14 and the spacer 16, is secured to this member so as to be subject therewith to the resultant of the displacements of the two pistons rods 44 and 46.

The valve member 26 is connected to a control member 48 which is slidably mounted in a carriage 50. The carriage 50 is mounted for movement in a direction A parallel to the direction of movement of the piston rod 44 and of the direction of the plane of the axes of the ports 31 and 32. The control member 48 is mounted for movement with the carriage 50 in this direction and for movement relative to the carriage 50 in a direction B normal thereto and parallel to the direction of movement of the piston rod 46 and of the direction of the plane of the axes of the ports 33 and 34.

The position of the working ports 31, 32, 33 and 34 is such that a movement of the ring member 26 in any given direction will increase the degree of communication of one port (say 31) of at least one pair of working ports with say the space outside the ring member and the other port (say 32) of that pair with the space inside the ring member; a movement of the ring member in the opposite direction will reverse this effect. Also, movement of the ring member is able to alter differentially or in equal measures (according to its direction) the degree of communication between the pairs of ports and the space inside and outside the ring member.

In operation the control member 48 is manipulated in the direction of the movement desired in the member (not shown) whose movement is to be effected. This results in a movement of the carriage 50 in the direction A and a movement of the member 48 relative to the carriage 50 in the direction B, the component movements having a resultant in the direction desired.

As the valve casing 10 is initially stationary, the valve member 26 is moved relative to the casing and its movement consists of components in directions parallel to the directions A and B. These movements tend to expose one of each pair of valve ports to the space between the spacer 16 and valve member 26, which space is supplied with air under pressure through the bores 22 and 24. Air under pressure is therefore supplied to the appropriate ends of the servomotors 36 and 38 to effect movements of the piston rods 44 and 46 in directions parallel to the directions A and B. Air is exhausted from the other ends of the servomotors, as the other of each pair of valve ports is exposed to atmosphere around the outside of the valve member 26.

Movement of the piston rods 44 and 46 is conveyed to the member whose movement is to be effected and so to the valve casing 10. Thus when the casing 10 has executed the same movement as the control member 48 and valve member 26, the valve member is again centralised in the casing and the valve ports again covered. In this way the system is a follow-up system.

It will be appreciated that if the valve member 26 is displaced so as to effect an opening in one pair of valve ports, the amount of lap of the other pair of valve ports whether overlap or underlap, will be altered, but it will be altered equally on each of the latter pair of ports.

The permitted movement of the ring member from the datum position is not greater than the diameter of the ports, so that upon a relative translational movement of the ring member from the datum position in any given direction the communication of a first one of the valve ports with one of the inner and outer spaces increases by a first amount, and the communication of a second one of the valve ports with one of the inner and outer spaces increases by a second amount, the first and second amounts being functions respectively of the resolved components of the displacement in two different directions.

From the above description, it will be clear that if the control member 48 is moved a distance of, say, one inch in a predetermined direction, the servo control valve will regain its equilibrium state when the valve casing 10 has been moved an equal distance in the same direction. In the invention as so far described, such movement of the valve casing 10 is effected by securing the valve casing to the member whose movement is to be effected so that, in other words, a 1:1 linkage links that member and the valve casing 10. In a modification of the invention (not shown in the drawings), the valve casing 10 is connected to the member whose movement is to be effected, by way of a pantograph linkage such that the movements of that member and the valve casing 10 remain similar, but not equal, the pantograph linkage being arranged to have either a magnifying or a reducing action; in this way, the said movement of one inch of the control member 48 can be arranged to produce a resulting greater or lesser movement of the said member.

Movement of the ring member is facilitated by tapering the valve clearances. Thus, the ring member may be of radially outwardly tapering cross-section, so that the clearance between each guide plate and the ring member, measured adjacent the inner cylindrical surface thereof, is .0002" and measured adjacent the outer cylindrical surface is .0004".

In a second embodiment of valve according to the invention (FIGURE 3), for use in the system shown in FIGURE 2, the valve casing is similar to the valve casing of the valve shown in FIGURES 1 and 2, but the movable valve member is of a different shape. Thus instead of a circular ring member 26, a substantially rectangular ring member 60 is used. The member 60 has four straight integral portions 62, 64, 66 and 68 of rectangular cross-section. Each limb forms a straight land to centrally cover a valve port and the lap remains the same in one direction during movement in the direction normal thereto.

It will be understood that operation of the valve shown in FIGURE 3 is similar to that shown in FIGURES 1 and 2.

A third form of valve according to the invention (FIGURE 4), for use in the system shown in FIGURE 2, is particularly suitable for the control of hydraulic-pressure-operated servo motors. The valve casing 10 consists of two flat plates (of which the upper plate 12 only is shown) held apart by spacers 70. Hydraulic fluid under pressure is applied to the middle of an annular valve member 72 through an inlet port 74.

Figure 4:
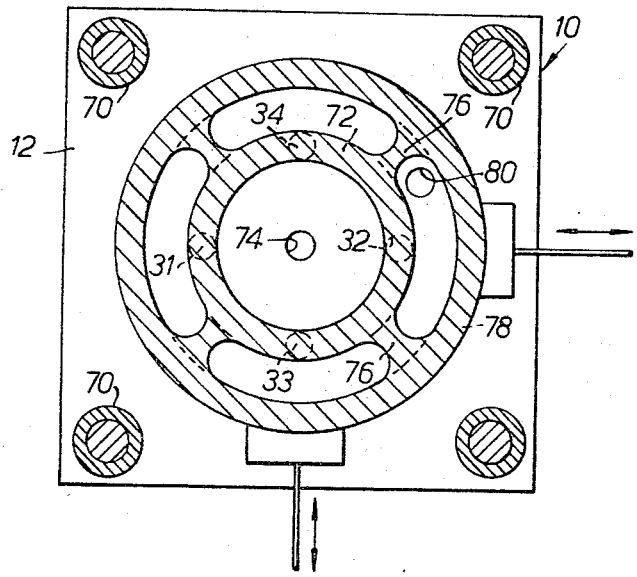
FIGURE 4 is a section, similar to that of FIGURE 3, of a third form of valve according to the invention.

The valve member 72 is similar to the member 26, and, in a central position, covers valve ports 31–34 which are, as before, connected to servomotors (not shown in FIGURE 4). The valve member 72 is connected by four webs 76, which do not engage the flat plates, to a closure ring 78 connected to a control member (not shown). The ring 78 is slidably mounted between the plates of the casing 10, which act as seals, and an exhaust port 80 leads to the fluid reservoir from the annular space between the ring 78 and the valve member 72.

The operation of the valve is similar to that of the valve shown in FIGURES 1 and 2 but the ring 78 prevents the escape of hydraulic fluid and ensures its return to the reservoir.

I claim:

1. A fluid pressure servo control valve comprising a pair of spaced parallel guide faces, a valve member in the form of an endless limb, having opposed end surfaces which are minutely spaced from the respective guide faces and define tapered clearances therewith, said member being slidably movable relative to said faces in two mutually transverse directions parallel with said faces, means defining a plurality of working ports each opening through one only of said pair of guide faces in positions where said ports can be substantially covered and closed by said valve member in one position of said member, and means for moving said valve member in either or both of said transverse directions for selectively varying the degree of opening of at least two of said working ports differentially or in equal measure.

2. A fluid pressure servo-control valve comprising a body having a spaced pair of parallel guide faces, a valve member in the form of an endless limb having an outwardly tapered cross-section, the valve member defining an inner space and located between said guide faces, the opposed end surfaces of said member being closely adjacent to each of said guide faces, means mounting said valve member for movement in two mutually transverse directions relative to and parallel with said guide faces, a central fluid port opening through one of said faces into said inner space, a plurality of working ports each opening through one only of said pair of guide surfaces, and means for selectively moving said valve member in either or both of said mutually transverse directions to vary differentially or in equal measure the degree of communication between said working ports and said central fluid port.

3. A fluid pressure servo-control valve comprising a body having a spaced pair of parallel guide faces, a valve member in the form of a ring member defining an inner space and located between said faces, the opposed ends of said member making substantially sliding sealing engagement one with each of said faces, said ring member having opposed end surfaces which are outwardly convergent, means mounting said valve member for movement in two mutually transverse directions relative to and parallel with said guide faces, two pairs of working ports, all of said ports opening through one only of said guide faces, each pair of ports being connected by an imaginary axis parallel with said guide faces and inclined to the axis connecting the other pair of ports, said valve member having a datum position in which it seals substantially equally all of said ports, and means for moving said valve member away from said datum position in either or both, simultaneously, of said mutually transverse directions, whereby said movement is effectively resolved into components along each of said imaginary axes for varying differentially or in equal measure the opening of said pairs of ports.

4. A valve according to claim 3, wherein said valve member has a closure member fast therewith, said closure member surrounding and being spaced from said ring member so as to define therewith an outer space, said valve having a fluid port leading to said outer space.

5. A fluid-pressure servo control valve which includes a pair of spaced parallel guide faces, four working valve ports opening each through one or other of said faces, a ring member in the form of a uniform endless limb which is circular in plan view and located between said faces and forms the outer boundary of an inner space within the ring member and the inner boundary of an outer space outside of the ring member, said ring member having opposed part conical end faces disposed adjacent said respective guide faces and convergent in the radially outward direction of said ring member, the ring member being slidably movable relative and only parallel to said guide faces and having a relative datum position at which the four ports are equi-angularly disposed around the ring member and are substantially equally sealed by corresponding parts of the ring member, and means for effecting relative displacement of the ring member from the datum position by an amount small in relation to its diametral size and in any direction to increase communication of a first two diametrically opposite valve ports respectively with the inner and the outer spaces by first amounts, and to increase communication of the remaining two diametrally opposite valve ports respectively with the inner and the outer spaces by second amounts, the first and the second amounts being functions respectively of the resolved components of the displacement in two mutually perpendicular directions.

6. A fluid-pressure servo control valve which includes a pair of spaced parallel guide faces, four working valve ports opening through one only of said faces, a ring member in the form of a uniform endless limb divided into four straight parts so as to be rectangular in plan view and located between said faces so as to form the outer boundary of an inner space within the ring member and the inner boundary of an outer space outside of the ring member, said ring member having opposed end surfaces which are equally and oppositely inclined to the respective adjacent guide surfaces, the ring member being slidably movable relative and only parallel to said guide faces and having a relative datum position at which the four ports are respectively located at the centres of said four straight parts of the ring member and are substantially equally sealed by corresponding parts of the ring member, and means for effecting relative displacement of the ring member from the datum position in any direction to increase communication of a first two diametrally opposite valve ports respectively with the inner and the outer spaces by first amounts, and to increase communication of the remaining two diametrally opposite valve ports respectively with the inner and the outer spaces by second amounts, the first and second amounts being functions respectively of the resolved components of the displacement in two mutually perpendicular directions.

7. A fluid-pressure servo system comprising two fluid operated servo motors each having a movable member movable in a direction inclined to the direction of movement of the movable member of the other said motor, and a servo control valve for controlling the supply of fluid to each of said motors, said valve including a spaced pair of parallel guide surfaces, two working ports opening through one of said surfaces, a valve member in the form of an endless limb, located between said guide surfaces and mounted for sliding movement in any direction parallel with said guide faces, said valve member having separate portions spaced along said endless limb each adapted to seal at least partially a different one of said working ports in a datum position of said valve member, said ring member having opposed end faces which are equally and oppositely inclined to the respective adjacent guide surfaces, means for selectively moving said valve member in any direction parallel with said guide surfaces to control independently the opening of each of said working ports, and means connecting each of said ports with a different one of said servo motors.

8. A valve according to claim 1 wherein said endless limb is in the form of a ring member, the spacing between each of said end surfaces of the ring member and the respective guide face being about .0002" measured adjacent to the inner diameter, and about .0004" measured adjacent to the outer diameter of the ring member.

References Cited

UNITED STATES PATENTS

| | | | |
|---|---|---|---|
| 2,487,116 | 11/1949 | Eaton | 91—368 X |
| 2,503,881 | 4/1950 | Manis | 137—625.42 X |
| 2,980,985 | 6/1961 | Callin et al. | 251—324 |
| 3,020,927 | 2/1962 | McLaughlin | 137—625.68 |
| 3,174,403 | 3/1965 | McCoy | 91—413 X |

M. CARY NELSON, *Primary Examiner.*

LAVERNE D. GEIGER, *Examiner.*

H. T. KLINKSIEK, *Assistant Examiner.*